United States Patent
Eng et al.

(10) Patent No.: US 9,865,085 B1
(45) Date of Patent: Jan. 9, 2018

(54) SYSTEMS AND METHODS FOR 3D MODELING USING SKIPPING HEURISTICS AND FUSING

(71) Applicant: Analytical Graphics, Inc., Exton, PA (US)

(72) Inventors: Austin Eng, Philadelphia, PA (US); Sean Lilley, Exton, PA (US); Daniel Bagnell, Exton, PA (US); Patrick Cozzi, Drexel Hill, PA (US)

(73) Assignee: Analytical Graphics, Inc., Exton, PA (US)

( * ) Notice: Subject to any disclaimer, the term of this patent is extended or adjusted under 35 U.S.C. 154(b) by 0 days.

(21) Appl. No.: 15/589,846

(22) Filed: May 8, 2017

(51) Int. Cl.
- *G06T 15/00* (2011.01)
- *G06T 17/00* (2006.01)
- *G06T 17/10* (2006.01)
- *G06T 15/40* (2011.01)

(52) U.S. Cl.
CPC .......... *G06T 17/005* (2013.01); *G06T 15/405* (2013.01); *G06T 17/10* (2013.01)

(58) Field of Classification Search
None
See application file for complete search history.

(56) References Cited

U.S. PATENT DOCUMENTS

| | | | | |
|---|---|---|---|---|
| 5,852,443 A * | 12/1998 | Kenworthy | ............ | G06T 15/60 345/441 |
| 6,348,921 B1 * | 2/2002 | Zhao | ...................... | G06T 17/20 345/428 |
| 6,426,750 B1 * | 7/2002 | Hoppe | ................... | G06T 17/20 345/423 |
| 2005/0099420 A1 * | 5/2005 | Hoppe | ................. | G06T 17/205 345/420 |
| 2012/0229445 A1 * | 9/2012 | Jenkins | .................. | G06T 15/60 345/418 |
| 2017/0091992 A1 * | 3/2017 | Rogers | ................. | G06T 17/005 |

OTHER PUBLICATIONS

Pintus, Ruggero et al., "Real-time rendering of massive unstructured raw point clouds using screen-space operators", in: DELLEPIANE, Matteo et al., "VAST'11 Proceedings of the 12th International conference on Virtual Reality, Archaeology and Cultural Heritage" Eurographics Association Aire-la-Ville, Switzerland, Oct. 18, 2011, 8 pages.
"Auto Splats: Dynamic Point Cloud Visualization on the GPU", in: Childs, H. et al, "Proceedings of Eurographics Symposium on Parallel Graphics and Visualization", May 13-14, 2012, 10 pages.

* cited by examiner

*Primary Examiner* — Yingchun He
(74) *Attorney, Agent, or Firm* — Carr & Ferrell LLP

(57) ABSTRACT

Systems and methods for three dimensional modeling using skipping heuristics and fusing are disclosed herein. An example method includes obtaining a plurality of three dimensional models of a target, each of the models having a unique resolution level, assembling an aggregate three dimensional model using a hierarchical tree representation of the plurality of three dimensional models by skipping levels of detail in the hierarchical tree and rendering the levels of the hierarchical tree that were not skipped. Fusing overlapping sections of the aggregate model can be accomplished using bivariate visibility testing.

30 Claims, 19 Drawing Sheets

SYSTEMS AND METHODS FOR 3D MODELING USING SKIPPING HEURISTICS AND FUSING

FIELD OF THE PRESENT TECHNOLOGY

The present disclosure relates to three dimensional modeling, and more particularly, but not by limitation, to systems and methods that render aggregate three dimensional models using a plurality of three dimensional models of differing resolutions. These systems and methods greatly reduce rendering time, as well as reduce data transfer overhead.

SUMMARY

Various embodiments of the present technology include a method for skipping levels of detail when rendering an aggregate three dimensional model using a plurality of three dimensional models, the method comprising: (a) applying a skipping heuristic to bound changes in visual quality when rendering the aggregate three dimensional model, wherein the heuristic is defined by any of a minimum percentage change in screen space error and a minimum change in a level index, or a combination thereof, where one or more nodes in a plurality of nodes in a three dimensional model are not loaded, the three dimensional model being represented as a hierarchical tree comprising the plurality of nodes; (b) for each of the plurality of nodes, using the hierarchical tree for choosing a desired node and rendering either the desired node or a next best node using a selection heuristic; and (c) displaying the aggregate three dimensional model.

Various embodiments of the present technology include a method comprising (a) obtaining a plurality of three dimensional models of a target, each of the models comprising a unique resolution; (b) assembling an aggregate three dimensional model by: (i) creating a hierarchical tree representation representing the plurality of three dimensional models, the hierarchical tree comprising a root node representing a lowest resolution of the plurality of three dimensional models, child nodes that represent higher resolution versions of the root node, wherein nodes lower than the child nodes comprise a sub-section of the child node to which it belongs and have a higher resolution level than the child node from which it depends; (ii) skipping any combination of the root node, at least a portion of the child nodes, and the nodes lower than the child nodes according to a skipping heuristic that utilizes any of screen space error values and a minimum change in a level index as the basis for skipping; (iii) loading a portion of the hierarchical tree that was not skipped while executing the skipping step; and (iv) assembling the aggregate three dimensional model from the portion of the hierarchical tree that was not skipped.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1A:
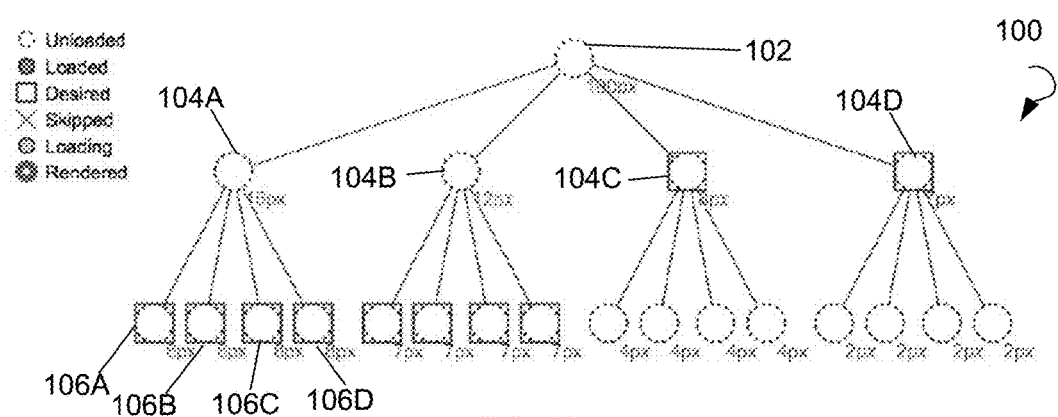
FIGS. 1A-E collectively illustrate the creation and use of a hierarchical tree created from a plurality of three dimensional models of a target, each of the models having a different resolution level.

For context, hierarchical level-of-detail (HLOD) is a technique used to decrease memory usage for large models. When the camera is far from a model, it is unnecessary to use high-resolution vertex and texture data. When the camera is far from a model, large chunks of low-resolution data are used. When the camera is near to the model, smaller chunks of high-resolution data are used. Geometric data of objects are stored in the nodes of a three-dimensional spatial tree. Each node can be thought of as a spatial bounding volume for the data it contains. Each node may have any number of children which usually contain higher resolution data.

Each node specifies a geometric error of its associated data. Geometric error is a measure of much far a low-resolution model differs from the true model. Geometric error, distance to camera, and field of view are used to calculate screen space error, which is a measure of how much a low-resolution model differs from the true model when rendered on a display. Models with a large geometric error can have a small screen space error if they are far from the camera.

Based on the screen space error metric, the node of lowest resolution that satisfies a specified maximum screen space error can be selected. Models far from the camera will be rendered with a low-resolution version and models near the camera will be rendered with a high-resolution version.

Data for HLOD can be structured as a hierarchical tree where each node contains data for a certain level of detail. A union of the children of a node contains a higher resolution representation of that node.

HLOD processing can begin with a low-resolution model to replace it with higher resolution versions successively until the maximum screen space error is satisfied. This process of replacing the model until it meets a specified quality is called "replacement refinement". If the camera is close to the model, there is significant overhead due to downloading, processing, and rendering all of the low-resolution levels of detail (LODs) until the desired visual quality is achieved.

An example solution to this problem is to immediately download and draw the high-resolution content without gradually refining. However, if high-resolution content is not immediately available and needs to be downloaded over the network, there will be sudden undesirable changes in visual quality. Furthermore, current replacement refinement techniques do not replace low-resolution content until all high-resolution content becomes available. When rendering large models, especially those with heavy textures, there is a significant delay in the refinement process.

The present disclosure provides solutions to these problems.

In some embodiments, the present disclosure is directed, in some embodiments, to systems and methods that quickly and efficiently render three dimensional models that are aggregations created from a plurality of three dimensional models of varying resolution levels. Rather than rendering the entirety of a high resolution three dimensional model which is computationally complex and may require excess bandwidth and time to download, the aggregated model includes sections of higher resolution and lower resolution. For example, if it is desired to create a three dimensional model of a city that is situated in a geographical area, it may be of less importance to render the surrounding geography but the end user desires to render the building in the city with higher precision. Using multiple models of varying resolution, sections of these models can be chosen and then fused together to create a hybrid or aggregate three dimensional model.

Sections of one or more of the plurality of three dimensional models can be selected for rendering using a skipping heuristic in combination with a fusing algorithm referred to as bivariate visibility testing. The bivariate visibility testing ensures that when overlapping portions of two or more models are rendered, the depth of objects and their rendering priorities are maintained.

In some embodiments, the present disclosure provides a system and method for data-efficient traversal of hierarchical level-of-detail (HLOD) trees. These systems and methods are used in conjunction with a system and method for accurate rendering of overlapping heterogeneous surfaces.

In sum, traversal of the HLOD tree skips nodes to decrease model loading overhead, but is bounded by changes in visual quality. This is employed to decrease data overhead for rendering surfaces with HLOD. The rendering process involves the system and method for accurate rendering of overlapping heterogeneous surfaces to maintain consistent visual quality. Overlapping heterogeneous surfaces are rendered simultaneously through the use of a bivariate visibility test. Depth information and a defined render priority of the geometric primitives are used with the stencil and depth buffers to create a visibility check which respects priority ordering for front-faces, and respects depth otherwise. Use of the bivariate visibility test and efficient application of it provide means for seamlessly rendering primitives at different levels of an HLOD tree.

These and other objects of the present disclosure are described in greater detail herein, with reference to the collective drawings.

Generally, embodiments of the present disclosure are configured to skip LODs in the HLOD tree and accurately blend multiple LODs of different resolutions. Mixing LODs is advantageous when it is desired to avoid visual artifacts possibly created by the LOD skipping process. These combined methods are effective for efficiently rendering many types of data, not limited to and including terrain, 3D buildings, photogrammetry models, CAD models, point clouds, and meshes derived from point clouds.

A level of detail (LOD) is equivalent to a node of a hierarchical tree.

Prior to rendering an aggregate three dimensional model, a plurality of three dimensional models are obtained where each has a varying or unique level of resolution. These varying resolution models all represent a single target. Examples of targets include, but are not limited to, terrain, three-dimensional buildings, photogrammetry models, CAD (computer aided design) models, point clouds, and meshes derived from point clouds—just to name a few, as mentioned above. The single target can comprise multiple objects such as three-dimensional buildings and terrain in the same single target.

The methods disclosed herein are amenable to execution through a rendering system that comprises a specifically configured computing system that is programmed to perform the methods disclosed herein. An example computing system that can be specifically configured according to the present disclosure is described in greater detail with respect to FIG. 19.

Referring now to FIG. 1A, a hierarchical tree 100 is created that represents each of the plurality of three dimensional models that are identified for the target. The hierarchical tree 100 comprises includes various types of nodes that correspond to the plurality of three dimensional models.

In some embodiments, the nodes comprise objects or portions of objects of the target. That is, the nodes include data that are used to create primitives of objects such as geometry that define surfaces and features of a building or curves of a hill or mountain. Primitives outline the faces of the objects of the target and can be defined as front or rear facing surfaces/primitives, which are properties computed at runtime based on which direction the primitive is facing, relative to the camera. These front/rear facing properties can be used to prioritize and rank primitives in the fusing/blending processes described herein.

A root node 102 at the head of the hierarchical tree 100 comprises a lowest resolution of a section of a model with the highest screen space error value. The section of the model referred to herein comprises a selected group or range of pixels. Other section types can be used, such as individual pixels or definable sectors of the models (e.g., squares, triangles, polygons, etc.).

The child nodes 104A-D correspond to higher resolution versions of the section compared with the root node 102. Nodes lower than the child nodes 104A-D are of successively increasing resolution levels and can comprise further subdivisions of the section into sub-sections. For example, lower nodes 106A-D could comprise higher resolution versions of sub-sections of the section represented by child node 104A. The child node 104A could be divided into fourths and distributed to the lower nodes 106A-D. This tree structure sub-division allows for further reduction in processing overhead as each lower node need only contain information for a portion of an ancestor node in the hierarchical tree 100.

The root node 102 has a screen space error value of 100 pixels, while child node 104A has a screen space error value of 16 pixels, child node 104B has a screen space error value of 12 pixels, child node 104C has a screen space error value of 8 pixels, and child node 104D has a screen space error value of 7 pixels.

Lower nodes 106A-D each have a screen space error value of 8 pixels. The other child nodes 104B-D each have corresponding lower nodes that have screen space error value that are less than their respective child node.

In order to efficiently render an aggregate three dimensional model, a skipping heuristic is applied. Skipping of LODs can be used to bound changes in visual quality. As noted earlier, jumping immediately to high resolution content can result in undesirable visual discontinuities (e.g., visual artifacts), but loading all resolutions is very costly from data download and computation perspectives.

Improved replacement refinement is utilized where a portion of the LODs are skipped based on the provided skipping heuristic. Instead of loading all LODs, an LOD is only loaded if it passes the provided skipping heuristic. In some embodiments, a node is viable for download if it is within a percentage threshold value of a screen space error of a current loaded node and at least a predetermined number of levels away from a current loaded node.

If a node is selected for rendering but is not loaded, the nearest ancestor which does have loaded content is rendered. If there is no ancestor, the descendants are selected. Instead of waiting for nodes to load before refining to a higher resolution, this method aggressively skips levels to quickly load the requested resolution. While it is waiting, it selects the best possible nearby node for rendering.

An example skipping heuristic algorithm can be defined formally as having a ruleset. The ruleset includes: given a desired node D (noted in FIGS. 1A-E as rectangular highlighted nodes) and its nearest loaded ancestor A, load the first node on the path from desired node D to nearest loaded ancestor A that satisfies a provided selection heuristic. If there is no such nearest loaded ancestor A, the root node is loaded. Given a desired node D, if desired node D is loaded, select desired node D for rendering. If desired node D is not loaded, select the nearest loaded ancestor for rendering. If there is no such ancestor, the nearest loaded descendants of desired node D are selected for rendering.

FIGS. 1B-E collectively illustrate the use of a skipping heuristic using the hierarchical tree 100. A legend for interpreting the node process is illustrated in FIG. 1A. In FIG. 1A, the initial tree has no nodes loaded for rendering. Desired nodes are noted by outlined as rectangles.

Figure 1B:
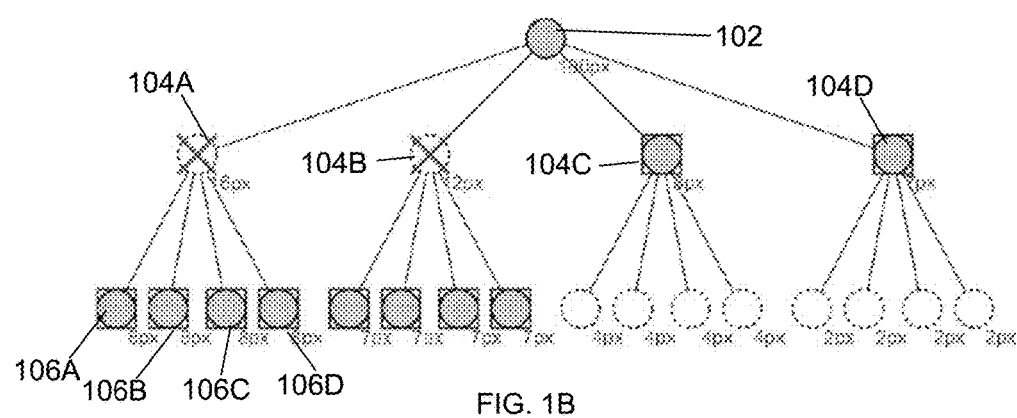

In FIG. 1B, a skipping factor of 10 is applied to the tree. Two child nodes 104A and 104B are skipped because they are not more than 10× the screen space error value of the other remaining nodes. The root node 102 is loaded in this instance.

Figure 1C:
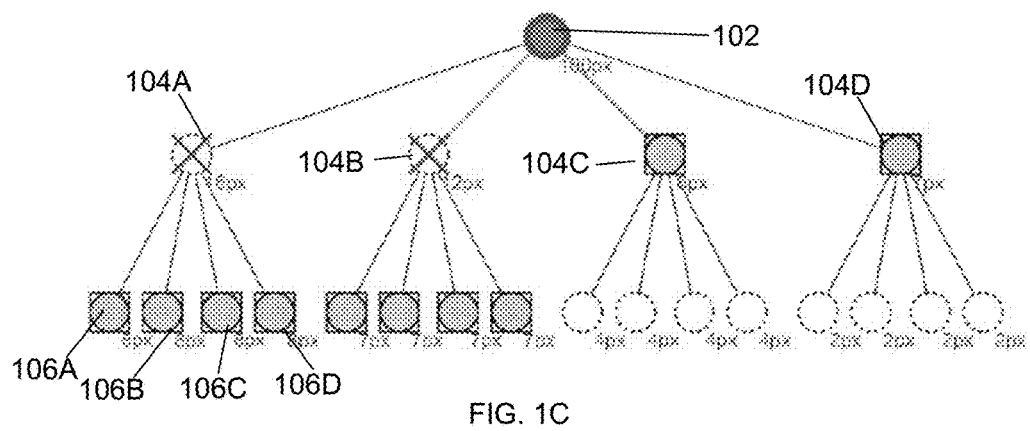
Figure 1D:
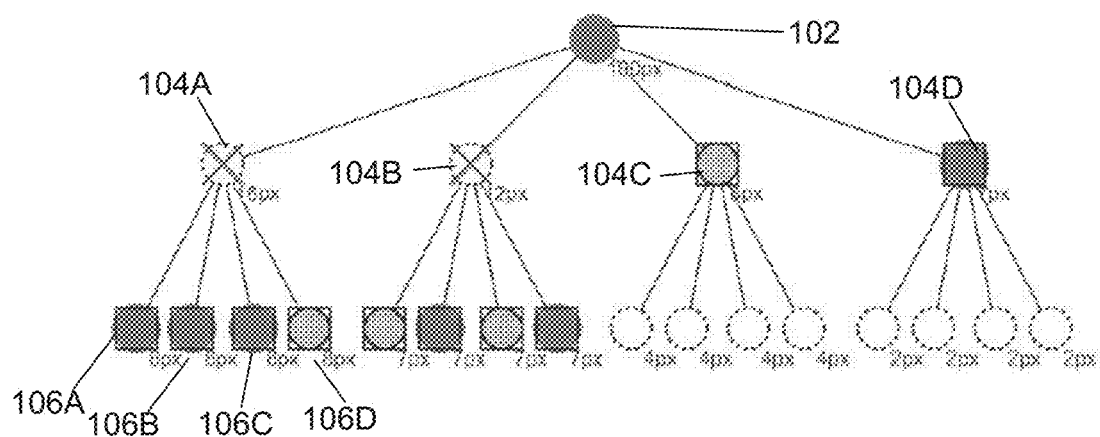

In FIG. 1C, as the root node 102 is loaded, it is simultaneously selected for rendering. In FIG. 1D, as other nodes load, such as child node 104C and lower node 106D (as well as all other nodes that are indicated as loading, such as lower nodes of child node 104B), these nodes are also selected for rendering. The root node 102 is still rendered because it has descendants that have not loaded, such as child node 104C and child node 104D.

For purposes of clarity, an ancestor node can comprise any node that is located higher up in the hierarchical tree 100 than another connected node, which is positioned lower. A descendant node is any node that is located below another connected node in hierarchical tree 100.

Figure 1E:
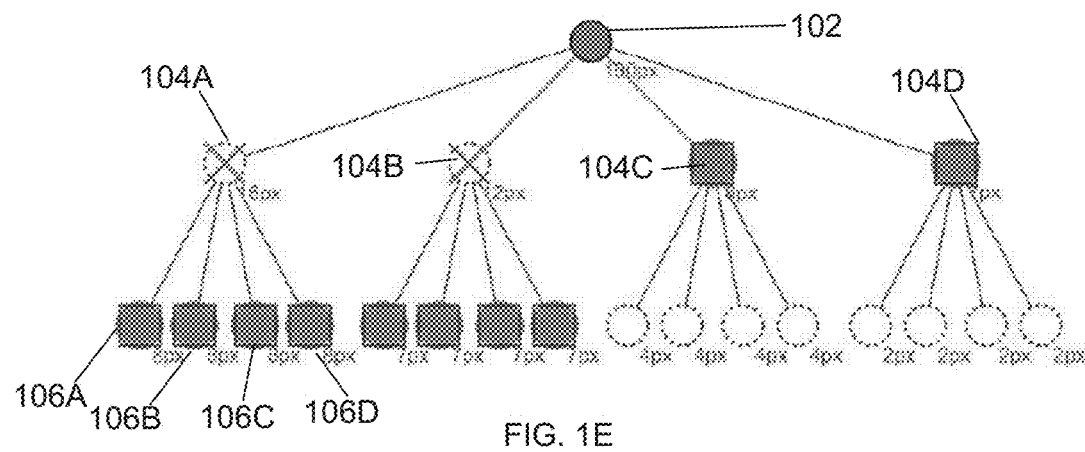

FIG. 1E illustrates that the root node 102 is not rendered once all requested descendant nodes have loaded and are available for rendering.

This process, while providing an efficient manner of skipping levels of detail when creating an aggregate three dimensional model, results in rendering nodes of different resolutions. Because the method chooses a best possible loaded ancestor for rendering, there is no guarantee that all nodes selected for rendering are of the same LOD. Furthermore, when using replacement refinement it is common for both a node and its descendant to be rendered.

FIGS. 2A-D collectively illustrates an example rendering process where a target comprising terrain is rendered into various models, which includes an aggregate three dimensional model.

Figures 2A, 2B:
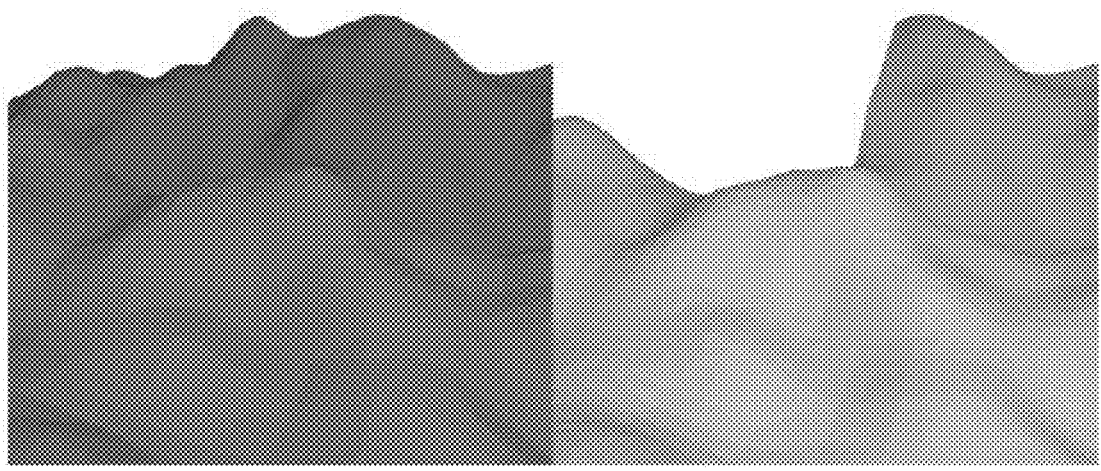
FIG. 2A illustrates a low resolution model of a target.
FIG. 2B illustrates a high resolution model of the target.
Figures 2C, 2D:
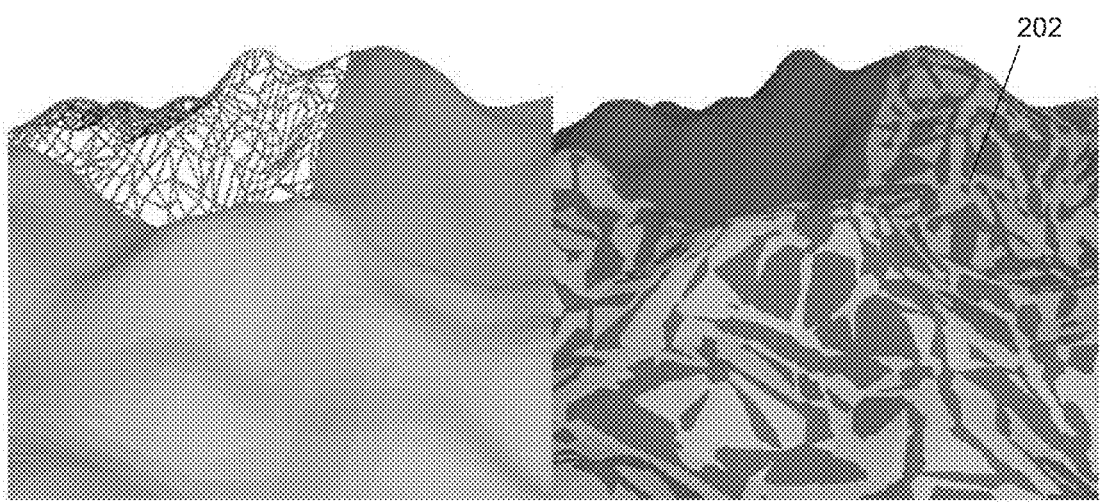
FIG. 2C illustrates an incomplete loading of the high resolution model.
FIG. 2D illustrates an overlapping rendering of both low resolution model and high resolution model.

In FIG. 2A, a low resolution geometrical model of the target is created. In FIG. 2B a high resolution geometrical model of the target is created. FIG. 2C illustrates that when the high resolution geometrical model is being rendered, a portion of the model is not completely loaded, leaving a portion of the model incomplete. FIG. 2D illustrates an aggregate geometrical model comprising sections of high resolution and low resolution.

Rendering of both the high resolution and low resolution models results in sections of overlapping geometry, which is indicated by mottled regions 202 of the model in FIG. 2D. In this example of rendering terrain, content in a lighter shade is not completely loaded. Because it is advantageous in some instances to show high resolution data as soon as possible, it is preferable to render the content in the darker shade in addition to the loaded content in the lighter shade simultaneously. However, this process may result in undesirable overlapping geometry.

Thus, in some embodiments, the process can involve the rendering system applying a bivariate visibility testing algorithm. The bivariate visibility testing algorithm is useful for fusing and rendering heterogeneous models, where some geometry should have a higher priority than other geometry. Low priority geometry is preferentially occluded by high priority geometry, in some embodiments.

FIGS. 3A-D illustrate this concept with respect to three dimensional models that represent the terrain, as well as buildings disposed on the terrain, which are higher in priority to the terrain.

In FIGS. 3A-D terrain (darker shaded areas) are rendered together with the buildings (lighter shaded areas). However, there is no trivial way to do this because the geometry intersects.

Figures 3A, 3B:
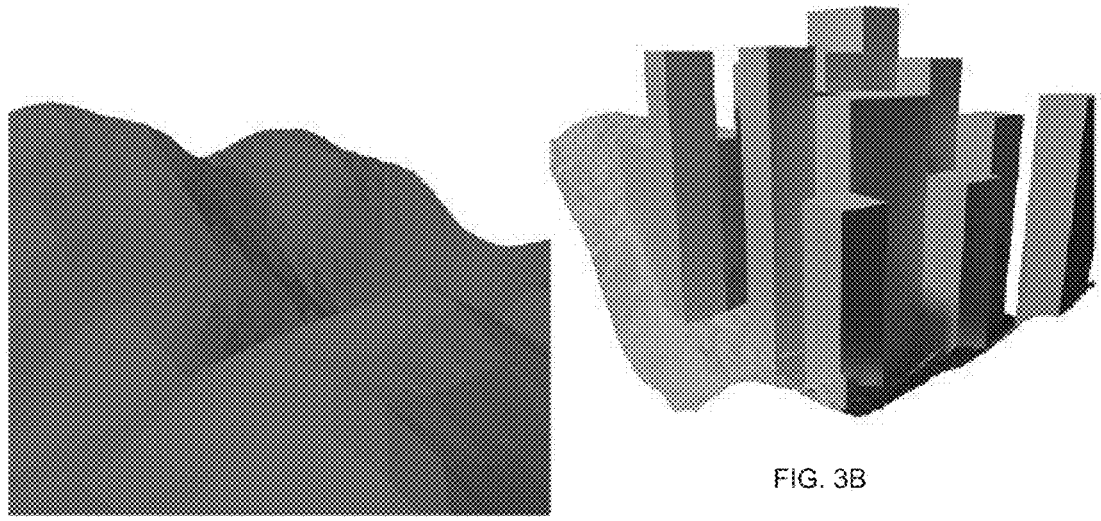
FIG. 3A illustrates a low priority model of a target.
FIG. 3B illustrates a high priority model of the target.
Figures 3C, 3D:
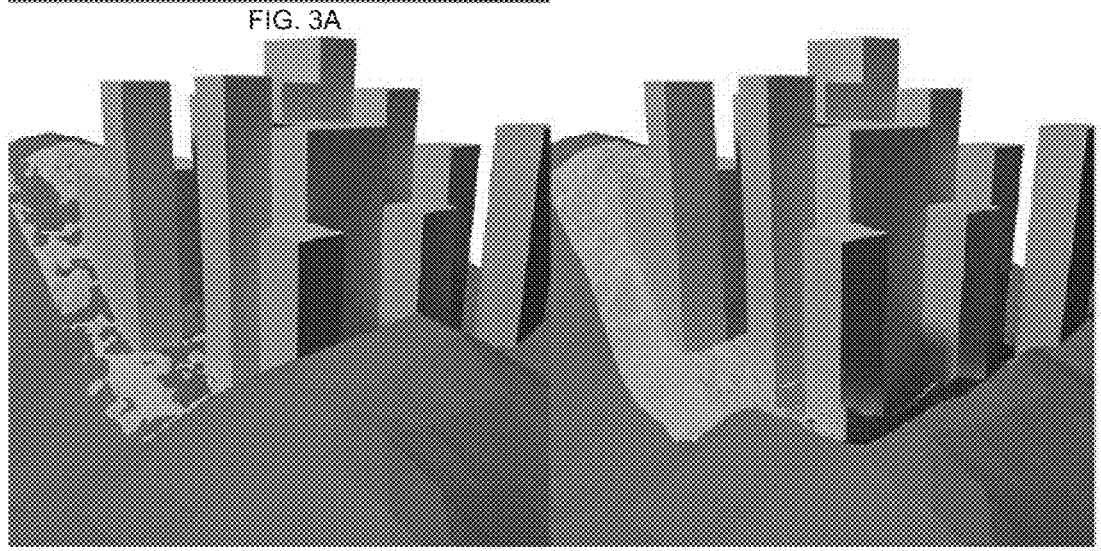
FIG. 3C illustrates a trivial rendering with overlapping.
FIG. 3D illustrates a trivial rendering with depth issues.

FIG. 3A is a low priority model, which includes only the terrain. FIG. 3B is a high priority model that includes high resolution versions of both the terrain and buildings. FIG. 3C illustrates an aggregate model created using the skipping heuristic that produces overlaps (e.g., mottled areas) between the plurality of three dimensional models. FIG. 3D illustrates the rendering of buildings in front of the terrain which inaccurately ignores depth information for the objects in the target. The buildings are not occluded behind the hills due to inaccurate rendering.

Figure 4:
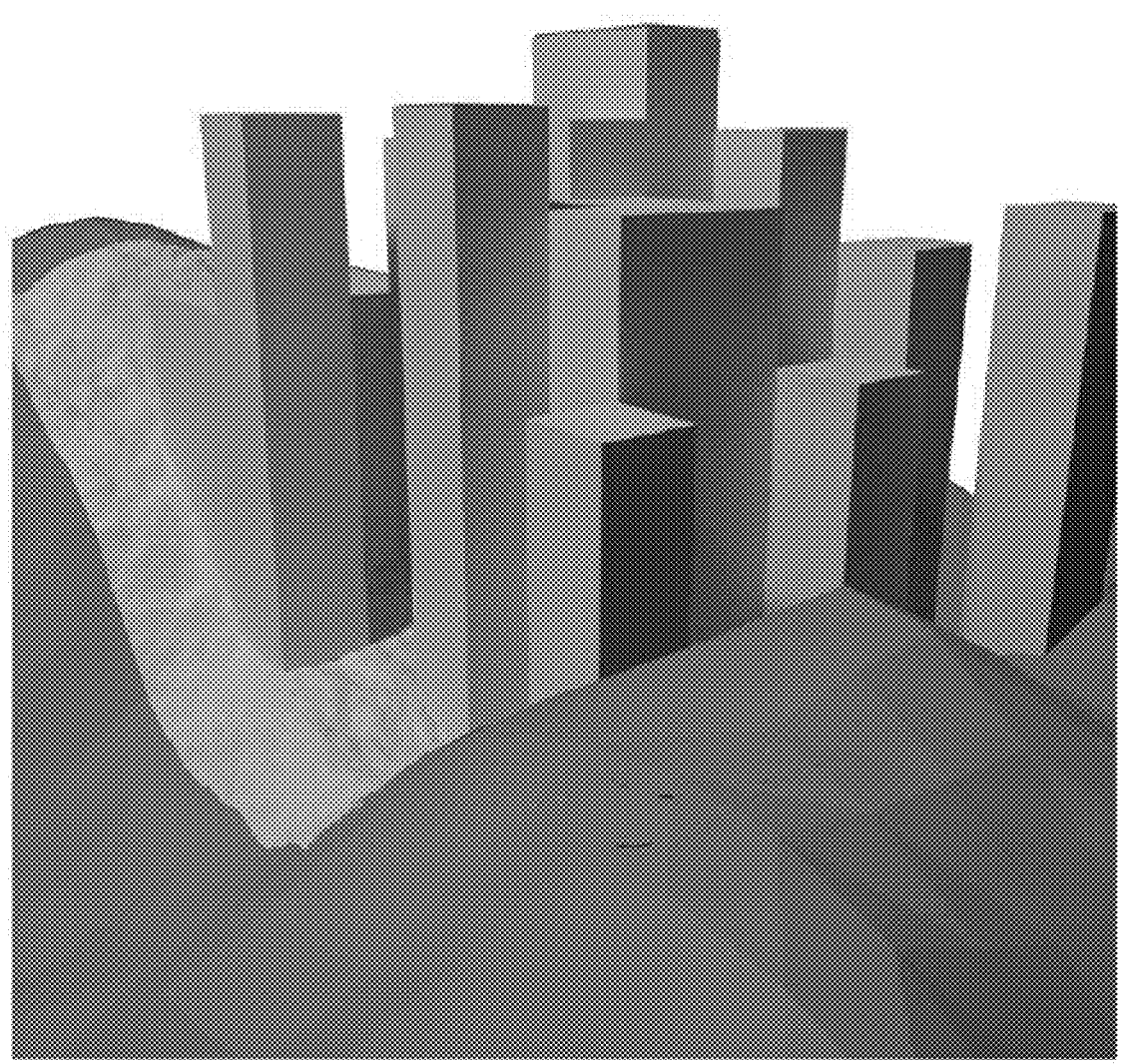
FIG. 4 illustrates a properly fused rendering of the target using both high priority model and low priority model.

FIG. 4 illustrates a result of bivariate visibility testing when applied to these models. The terrain properly occludes the buildings in front, but extra detail on the ground (lighter shaded areas at the base of the rearmost buildings) consistently renders in front of the terrain that are underneath. This effectively covers the mottled areas of FIG. 3D with lighter shaded (e.g., higher resolution data).

In more detail, the bivariate visibility testing method for rendering overlapping objects uses both depth and render priority to determine visibility. Render priority is a metric of visibility used to resolve fragment conflicts between front-facing primitives, regardless of depth. It asserts that front-facing primitives of higher render priority are rendered in front of front-facing primitives of lower render priority, even if the high priority primitives are behind the low priority primitives. Primitives of equal render priority respect the depth test. Back-facing primitives also respect the depth test, so high priority fragments (e.g., portions of primitives) do not render in front of low priority backfaces if they are located behind the backfaces.

The bivariate visibility testing comprises, in some embodiments, the use of render priority stenciling. Because there is no guarantee that a depth of a high priority fragment is less than a depth of a low priority fragment, the rendering system cannot rely on a depth test to properly in order to draw high priority primitives on top of low priority primitives. Instead, the rendering system uses a stencil buffer to keep primitives of greater render priority on top of other primitives. In some embodiments, render priority must be an integer between zero and a maximum value that can be stored in a stencil buffer.

In various embodiments, the rendering system puts primitives in a list and sorts them in order of decreasing render priority. For every pair of primitives u and v, u comes before v if u has a higher render priority than v. The rendering system then initializes the stencil buffer to zero. The rendering system then draw primitives with the stencil test enabled. The rendering passes the stencil test only if the primitives' render priority is greater than or equal to the value in the stencil buffer. Upon passing the depth test, the value in the stencil buffer is replaced with the primitive's render priority. In some embodiments, such as with translucent primitives or any primitive that does not write depth, the stencil test can be bypassed. The aforementioned process described above is referred to generally as render priority stenciling. Broadly, render priority stenciling comprises a method where application of a stencil buffer is used to ensure that fragments of a higher priority are always drawn in front of fragments of a lower priority, where priority is a particular, but arbitrarily determined values are used (it does not matter how this value was obtained. Every primitive is given a priority). A fragment is only drawn if its priority is greater than the priority of the existing fragment at that pixel. When a fragment is drawn, it writes its priority value to the stencil buffer.

The aforementioned steps ensure that primitives of high priority are drawn on top of primitives of low priority. Because the high priority primitives are drawn first and write to the stencil buffer, low priority fragments will fail the stencil test and will not be drawn over an existing high priority fragment because the render priority will not be greater than or equal to the value in the stencil buffer.

Figure 5:
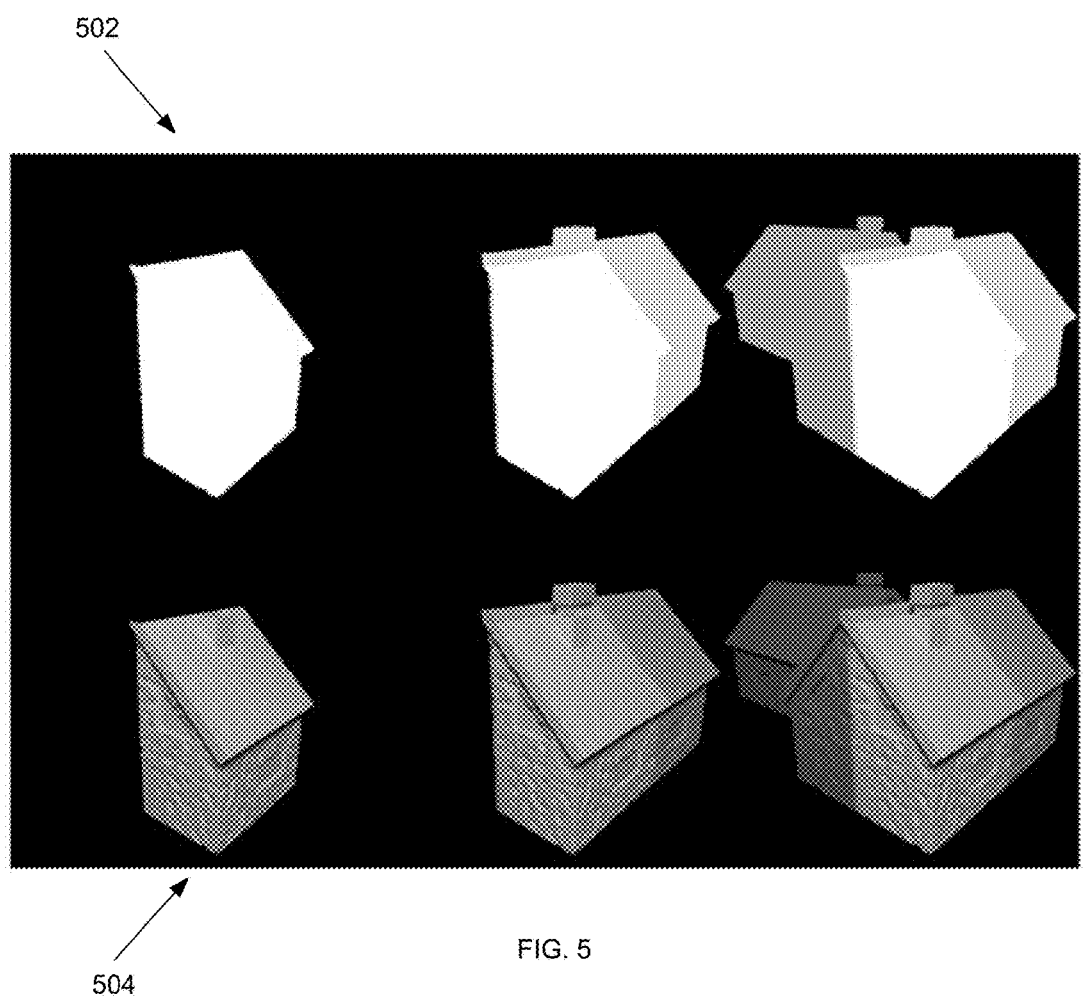
FIG. 5 illustrates a step-by-step process of using render priority stenciling.

FIG. 5 illustrates a step-by-step render using render priority stenciling. High priority primitives are rendered first and write to the stencil buffer. Medium priority primitives are then rendered, but only write fragments where they are greater than or equal to the current stencil value. Low priority primitives are drawn last. The stencil buffer is illustrated in the top row 502 and the images rendered are in the row below 504.

In some embodiments, the fusing process also involves accommodating for back-face Z-depth occlusion in the aggregate model. Z-depth refers to the third of a three dimensional axes of the display, where the z-axis provides depth aspects such as a building placed behind another building or object (creating foreground/background relationships). The x-axis could refer to the left to right position, and the y-axis would refer to bottom to top position.

Figure 6:
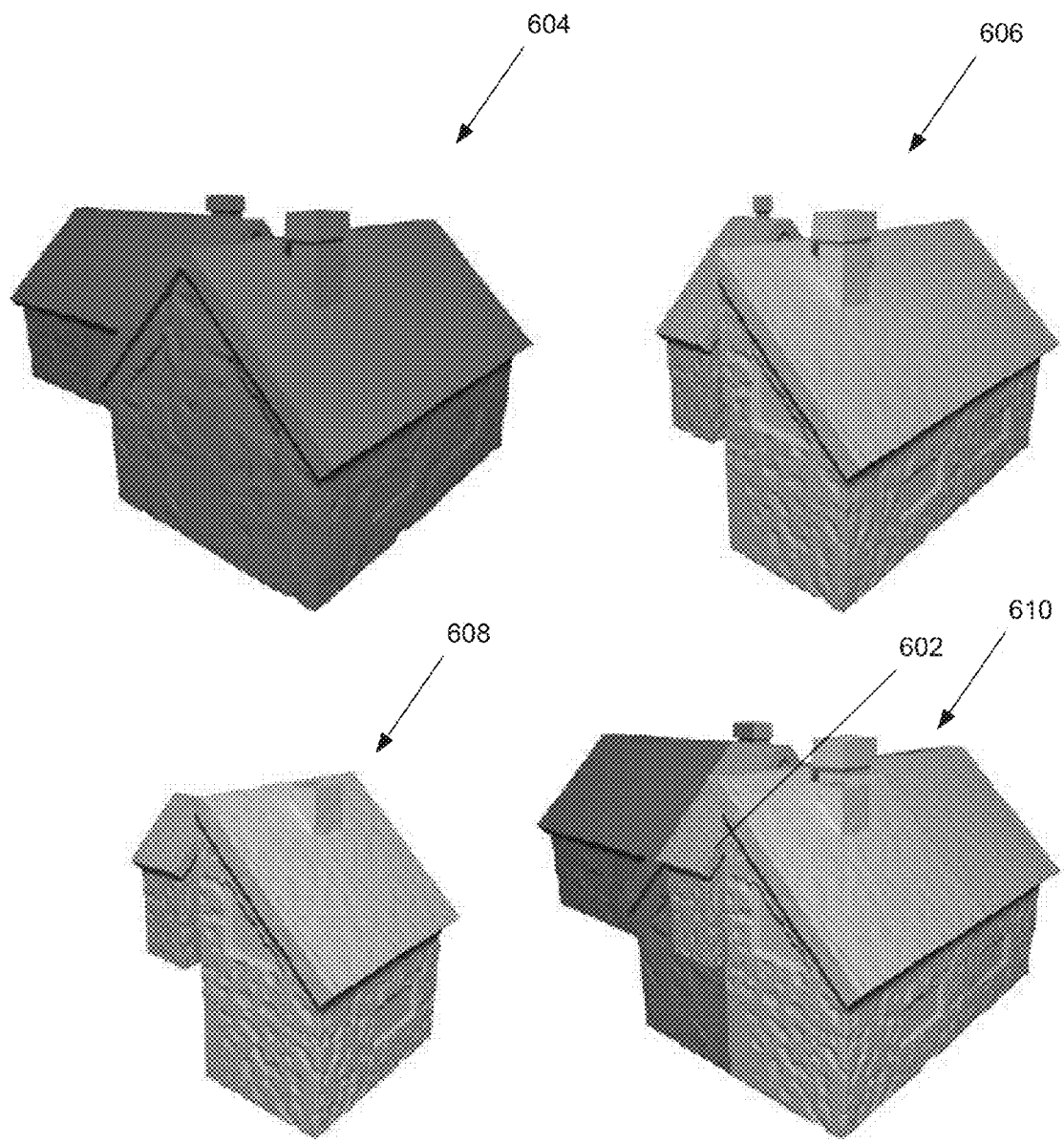
FIG. 6 illustrates various models with low, medium, and high priority primitives.

Render priority stenciling as described above ensures that high priority primitives always draw on top of low priority primitives. Stated earlier, this is true for front-facing primitives. Back-facing primitives should still respect the depth test. High priority fragments do not render in front of low priority backfaces if they are located behind the backfaces. Only doing render priority stenciling can result in undesirable visual artifacts as illustrated in FIG. 6. Only performing render priority stenciling always draws high priority primitives in front of lower priority primitives. This appears incorrect because some of the primitives from the building in the back are showing in front of the building in front in section 602.

The rendering in FIG. 6 appears inaccurate because high priority primitives sometimes are farther from the camera than low priority primitives. The upper left model 604 illustrates low priority primitives. The upper right model 606 illustrates medium priority primitives and the lower left model 608 illustrates higher priority primitives. When combined together the section 602 of the lower right model 610 has higher priority primitives from the lower left model 608 extending through the lower priority primitives, but some of these higher priority primitives are behind the lower priority primitives, causing a section of the house in the background to extend through the front surface of the house in the foreground.

In sum, the rendering system occludes any primitive that is occluded by a back-facing primitive, even if it has a high priority. High priority primitives only modify the stencil buffer after they pass the depth test, so to fix this problem, the rendering system can write all back-facing primitives to the depth buffer first. Then, when primitives are drawn using the stencil test, they will not be drawn by the rendering system and will not update the stencil buffer if they fail the depth test (e.g., occluded by a back-facing primitive).

Figure 7:
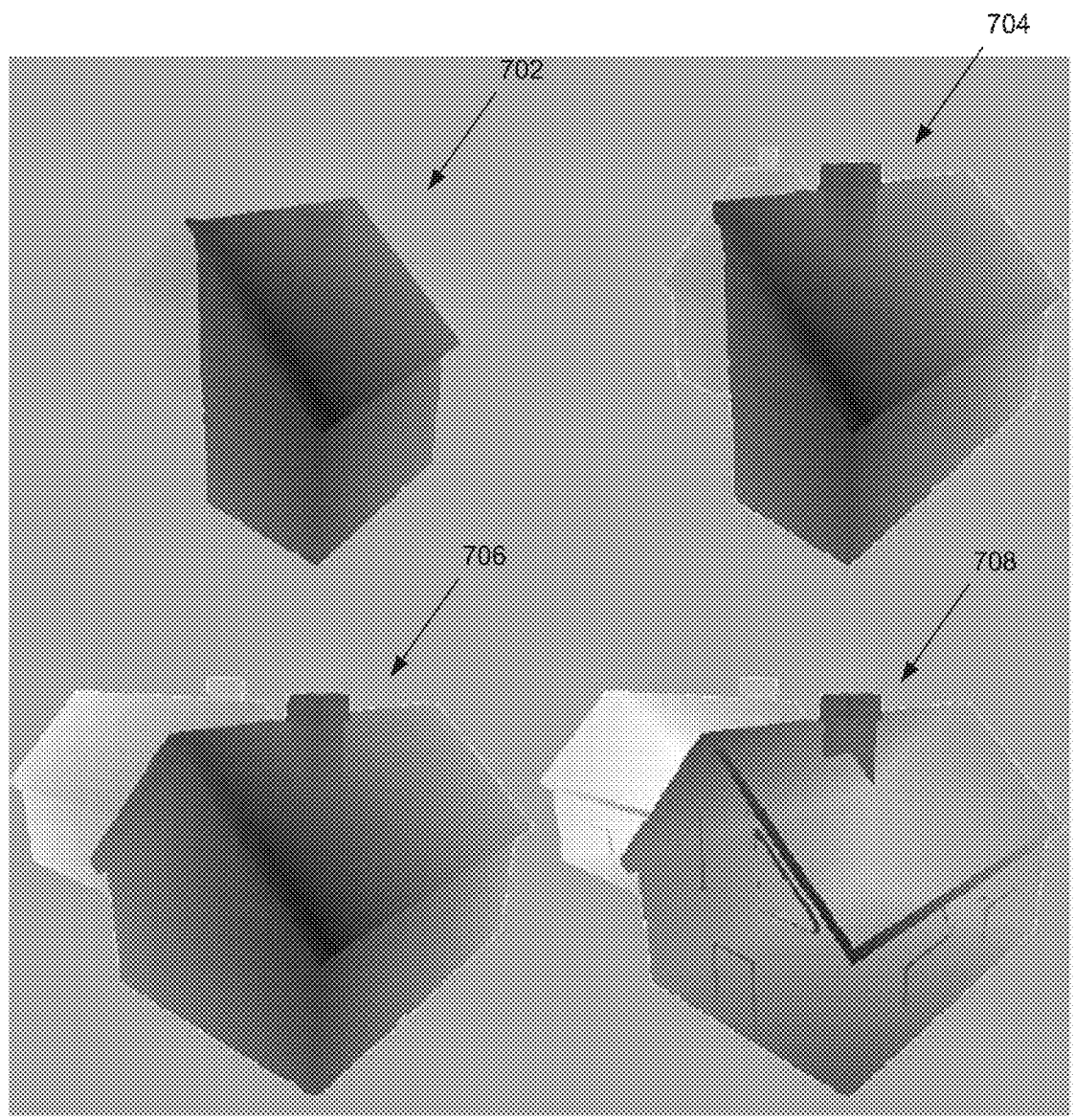
FIG. 7 illustrates z-depth analyses.
Figure 8:
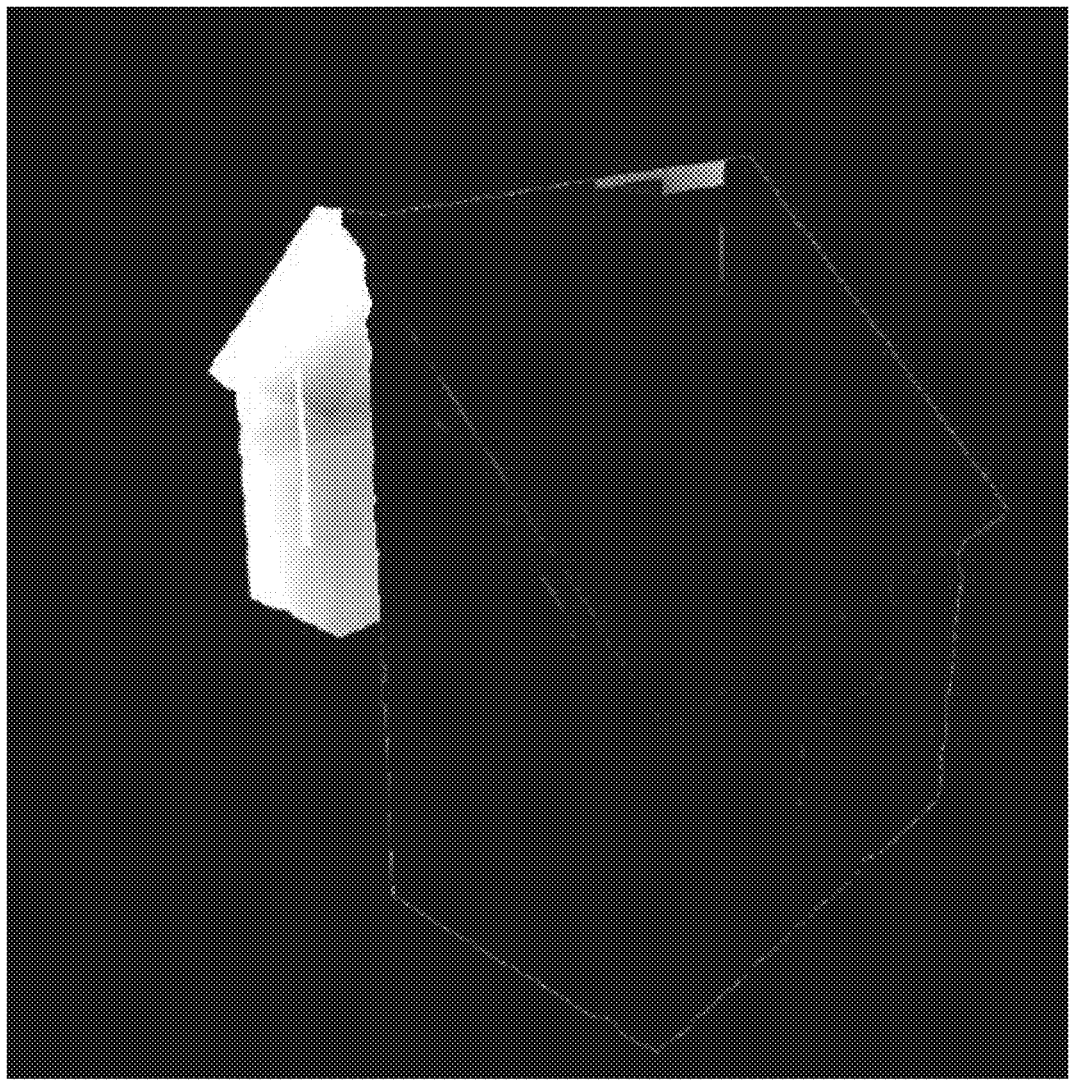
FIG. 8 illustrates stenciling with occluding of back-facing primitives/geometries.

FIG. 7 illustrates z-depth analyses. The model 702 has normalized depths of high priority primitives. The model 704 has normalized depths of medium priority primitives. The model 706 has normalized depths of low priority primitives. The model 708 has normalized depths of backfaces of all primitives. Primitives in black represent objects that are near to the camera, and white primitives are far from the camera. Models 702-706 illustrate z-depths of the high, medium, and low priority primitives, respectively. Model 708 shows the z-depths of all of their backfaces together. The proper relationship should be that any pixel in models 702-706 that is lighter than the corresponding pixel in model 708 should be occluded. This means that the pixel's depth is greater than the depth of the backfaces (so it is located behind it). FIG. 8 illustrates the pixel values in model 708 minus the values in model 702. The purpose is to show that the section 602 in the FIG. 6 has values that are lighter than the same corresponding pixels in model 708. This means that they are further from the camera than the pixels in model 708 (occluded by the backfaces).

FIG. 8 illustrates a model rendering where high priority depth is illustrated and back-face depth is reduced. Positive values (light areas) represent fragments that will fail the depth test and will thus be occluded by back-facing primitives/geometry.

Figure 9:
FIG. 9 illustrates an aggregate model that is created using both render priority stenciling and backface z-depth occlusion.
Figure 10:
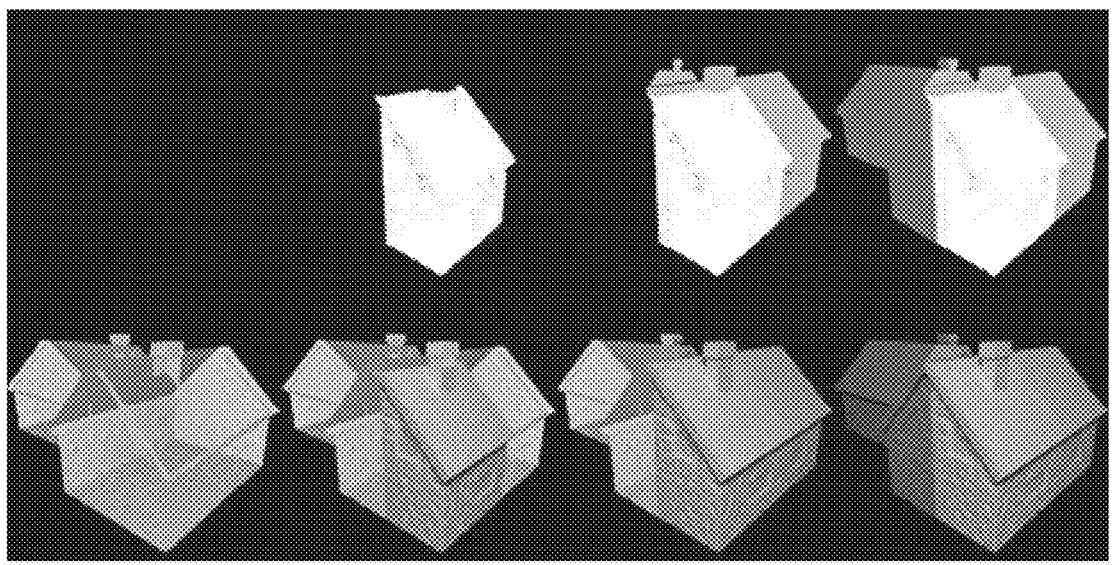
FIG. 10 illustrates a step-by-step rendering of an aggregate model using render priority stenciling and backface z-depth occlusion.

FIG. 9 is model of resultant render priority stenciling combined with back-face Z-depth occlusion. A step-by-step rendering using render priority stenciling with back-face z-depth occlusion is illustrated in FIG. 10.

According to some embodiments, skipping LODs often can result in rendering nodes of different resolutions. Because the rendering system chooses a best possible loaded ancestor for rendering, there is no guarantee that all nodes selected for rendering are of the same LOD. Furthermore, when using replacement refinement it is common for both a node and its descendant to be rendered. Because both the node and its descendant represent the same content, they may overlap. This can be particularly complex when dealing with models having objects with irregular geometries (see FIG. 11) or when objects have irregular z-depth values (see FIG. 12).

Figure 11:
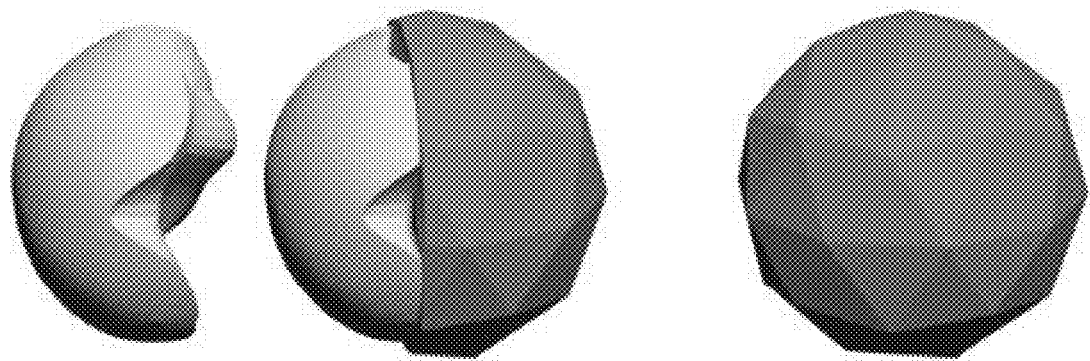
FIG. 11 illustrates complexities in irregular geometries.
Figure 12:
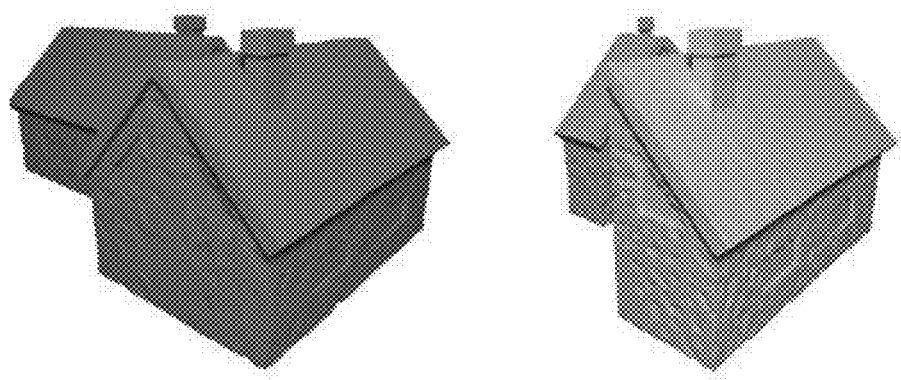
FIG. 12 illustrates complexities in irregular z-depth values.
Figure 12:
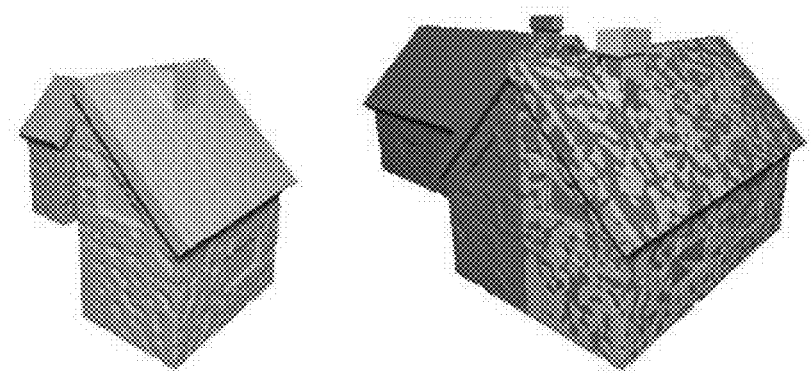

In FIG. 11, a clean splitting plane between nodes of different resolutions is not available. Nodes of lower resolution cannot be trivially clipped along a single plane. There is no simple splitting plane which divides the high resolution geometry (lighter shaded areas) and low resolution geometry (darker shaded areas). Attempting to separate them using a single plane leaves gaps and holes. In FIG. 12, nodes of high resolution may have a z-depth that is behind nodes of lower resolution.

Thus, only relying on the z-depth is unreliable unless there are occlusion-preserving LODs. These issues can occur during application of bivariate visibility testing.

Because of the difficulties involved in rendering nodes of different resolutions simultaneously, bivariate visibility testing is used to accurately render overlapping HLOD nodes. Consider a node A and some arbitrary descendant node B. When using HLOD, the content of node B represents some subset of the content of node A. If the content of node B is to be always rendered on top of the subset of A it represents, then this must hold true for all other ancestors. That is, the content of B must be rendered on top of the subset of any ancestor it represents. B has higher render priority than A. This is typically the case for HLOD. The higher resolution content in descendant nodes should be rendered in place of the lower resolution content of ancestor nodes.

Figure 13:
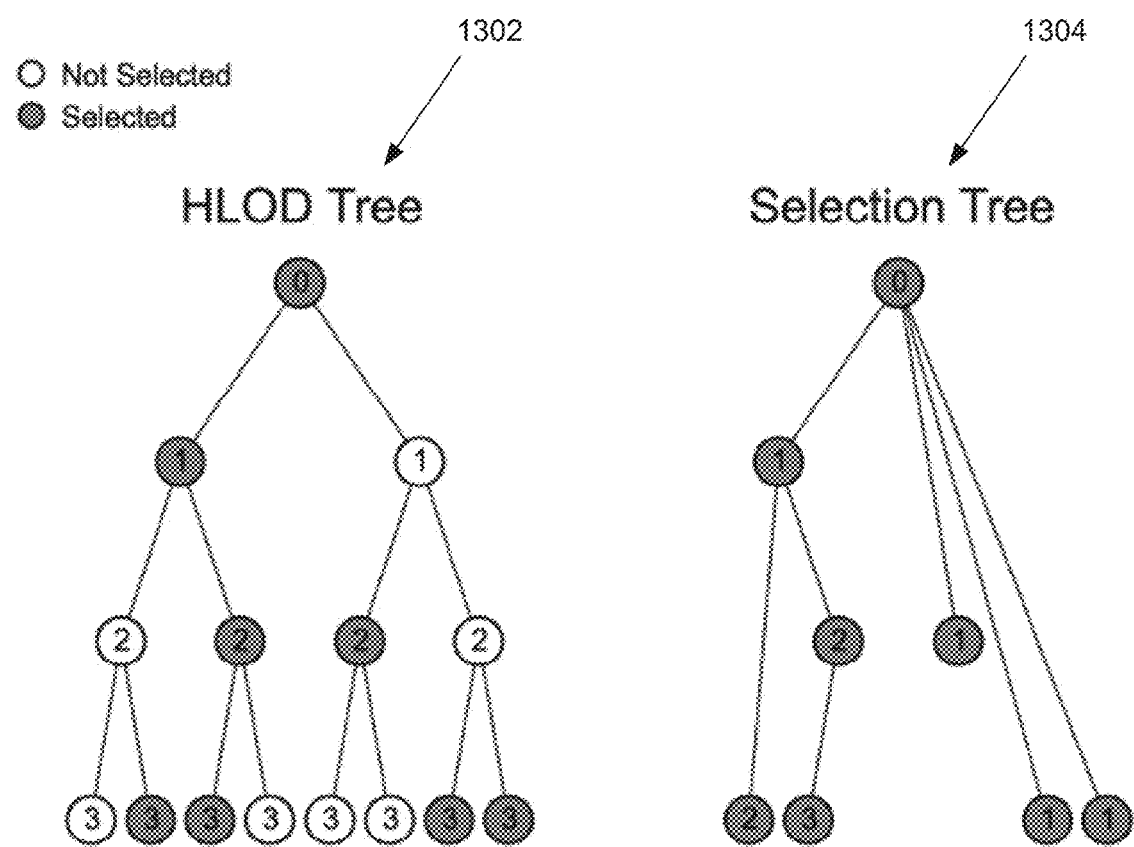
FIG. 13 illustrates a complete hierarchical tree and a corresponding selection tree.

FIG. 13 illustrates an example selection depth method that utilizes a hierarchical tree. Consider the entire hierarchy of nodes in the HLOD tree 1302. Let this tree be called T. Only a subset of these nodes may be selected for rendering. There may be nodes at different levels of detail in the tree. There is no constraint on what nodes are selected. Let tree S 1304 be the subset of the tree that contains only nodes selected for rendering. S contains only nodes that are selected. There is an edge between two nodes u and v in tree S 1304 if the shortest path between u and v in tree T 1302 does not contain any other selected nodes.

The selection depth of a node is its depth in the tree S 1304. This may be different from its depth in tree T 1302.

For standard replacement refinement, the render priority is set in the bivariate visibility test to the selection depth of a node in the HLOD tree. Descendant nodes will have a greater selection depth than their ancestors, so they rendered in place of their ancestors. When using selection depth as the render priority, descendants are drawn strictly before their ancestors. Whenever a node is drawn, the rendering system writes the node's selection depth to the stencil buffer. Furthermore, once a descendant has been drawn at a particular pixel, no ancestor can be drawn there because the ancestor's selection depth will not be greater than or equal to the descendant's selection depth. This maintains that high resolution nodes draw on top of their low resolution ancestors.

A node's selection depth is used in some embodiments and not its overall depth, because the stencil buffer is limited in size. The rendering system uses a value that increases in magnitude as it progresses down the tree so that descendants write a value to the stencil buffer that is greater than that of their ancestors. However, the stencil buffer very often only holds eight bits, meaning the values used can never exceed 255.

The selection depth allows the rendering system to minimize both the range of values used as well as the absolute values used. For example, the rendering system could have nodes selected with depths ranging from 200 to 300. This maps to a selection depth only ranging from 0 to 100. Furthermore, if only half of the nodes between the deepest and the highest node in the tree are selected, this would map to a selection depth ranging from 0 to 50. Though in practice most trees are no more than 20 levels deep, use of selection depth makes the technique more robust.

As mentioned above, the rendering system can provide improvements in situations where occlusion-preserving LODs are utilized. Rendering nodes at different resolutions uses bivariate visibility testing, but an alternate solution is to use an HLOD tree which has occlusion-preserving LODs.

Figure 14:
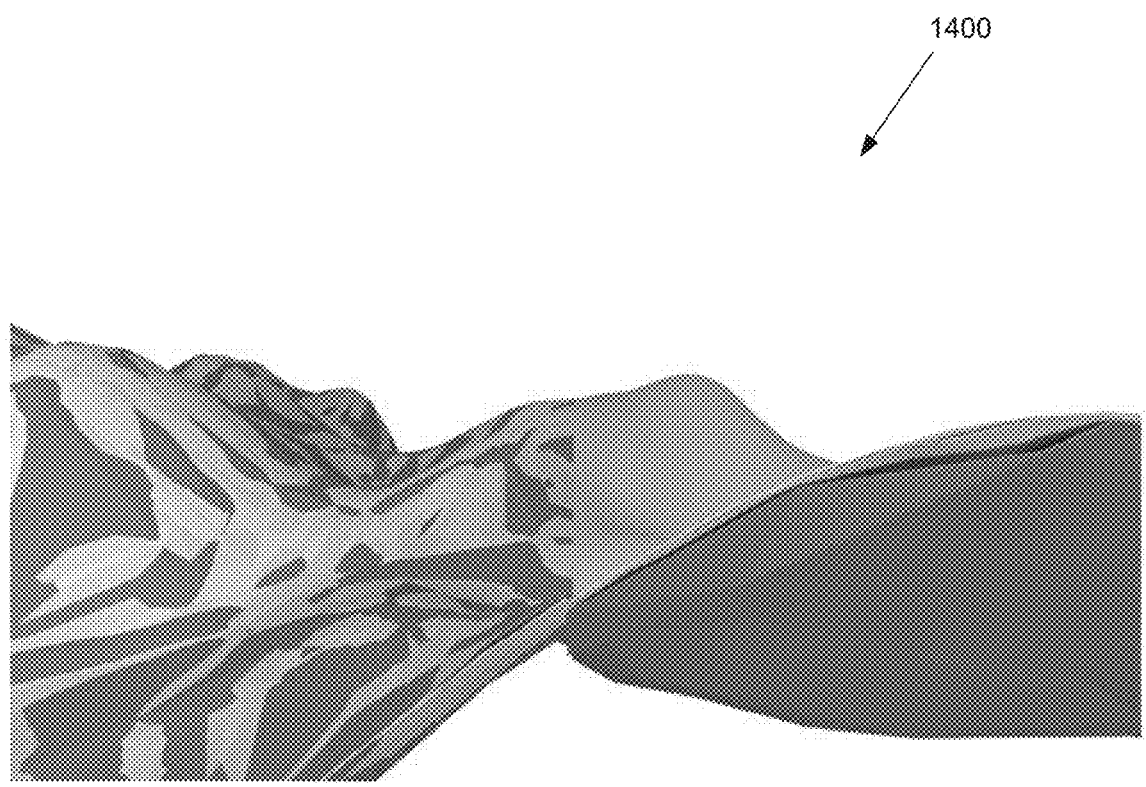
FIG. 14 illustrates an aggregate model that has a portion that comprises nonocclusion-preserving level of details (LODs) and a section with occlusion-preserving LODs.

An occlusion-preserving LOD is an LOD whose geometry is fully contained within the geometry of its parent. If this invariant holds true, then bivariate visibility testing is no longer necessary because the z-depth of high resolution content will always be nearer to the camera than its respective low resolution ancestor content. The depth test for this case is sufficient. FIG. 14 illustrates the use of occlusion-preserving LODs to render a model 1400. The model 1400 illustrates a comparison of simultaneously rendering of non-occlusion-preserving LODs and occlusion-preserving LODs. The darker areas are low resolution, whereas the medium dark areas are medium resolution. The lightest areas have high resolution.

On the left of the model 1400 multiple LODs are rendered simultaneously without any special techniques. The geometry overlaps in these areas, leading to a mottled appearance. On the right the model 1400 comprises generated occlusion-preserving LODs. They are rendered simultaneously without any special techniques, but there is no overlapping geometry. The low resolution geometry is fully below the surface of the high resolution geometry.

Figure 15:
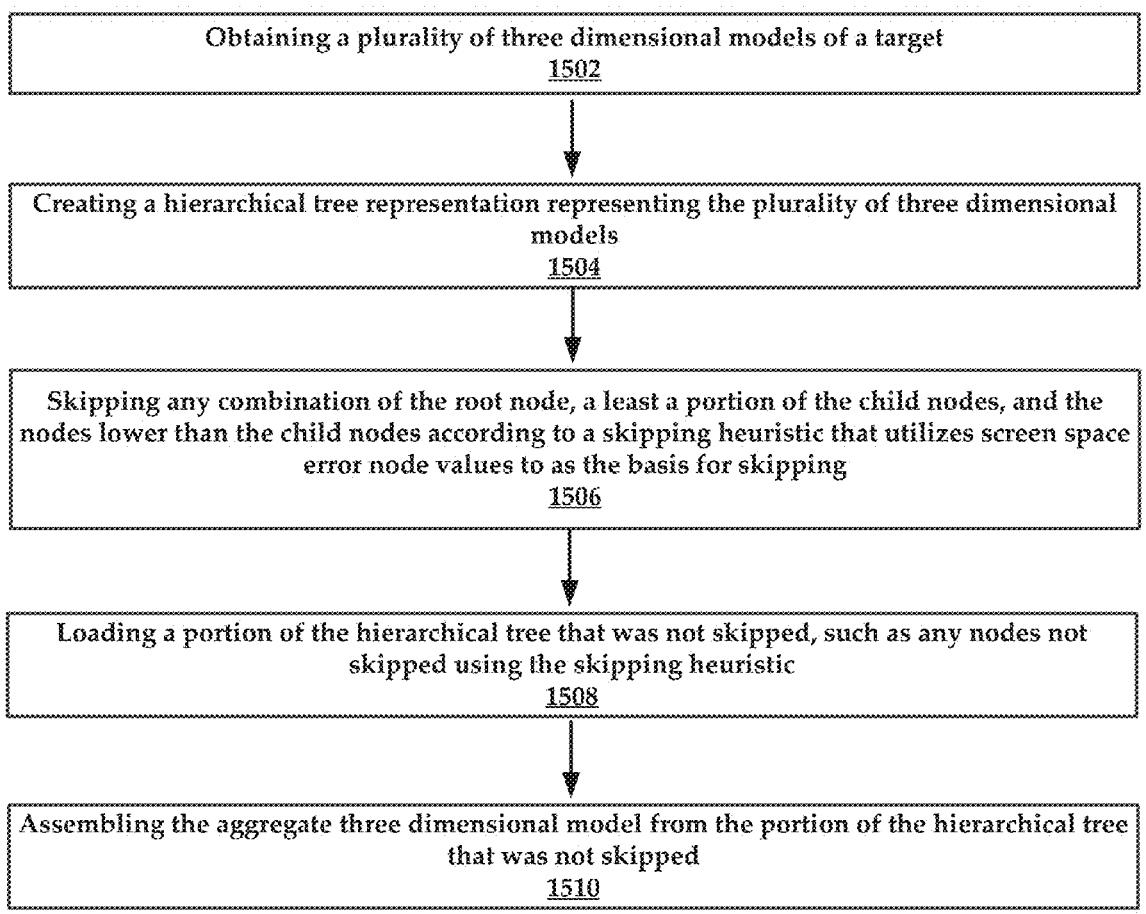
FIG. 15 is a flowchart of an example method for creating an aggregate model in accordance with the present disclosure.

FIG. 15 is a flowchart of an example method of the present disclosure. According to some embodiments, the method comprises a step 1502 of obtaining a plurality of three dimensional models of a target. As noted above, each of the models comprises a unique resolution level.

Next, the method includes assembling an aggregate three dimensional model by a step 1504 of creating a hierarchical tree representation representing the plurality of three dimensional models. As mentioned above, the hierarchical tree includes a root node representing a lowest resolution of the plurality of three dimensional models. Child nodes exist below the root node and these nodes represent higher resolution versions of the root node. Nodes lower than the child nodes comprise a sub-section of the child node to which it belongs at a higher resolution level than the child node from which it depends.

The method then comprises a step 1506 of skipping any combination of the root node, a least a portion of the child nodes, and the nodes lower than the child nodes according to a skipping heuristic that utilizes screen space error node values to as the basis for skipping.

Next, the method comprises a step 1508 of loading a portion of the hierarchical tree that was not skipped, such as any nodes not skipped using the skipping heuristic.

In some embodiments, the method includes a step 1510 of assembling the aggregate three dimensional model from the portion of the hierarchical tree that was not skipped.

In some embodiments, the method of FIG. 15 can be redacted to include the following procedures in order to create an aggregate model. In one embodiment the method can comprise obtaining a plurality of three dimensional models or using a plurality of models that have already been identified and obtained. Next, the method can comprise a step of selecting some subset of each of the plurality of three dimensional models.

Some embodiments comprise loading the selected portions of each of the plurality of three dimensional models, as well as assembling the aggregate three dimensional model from the portions of the models loaded.

Figure 16:
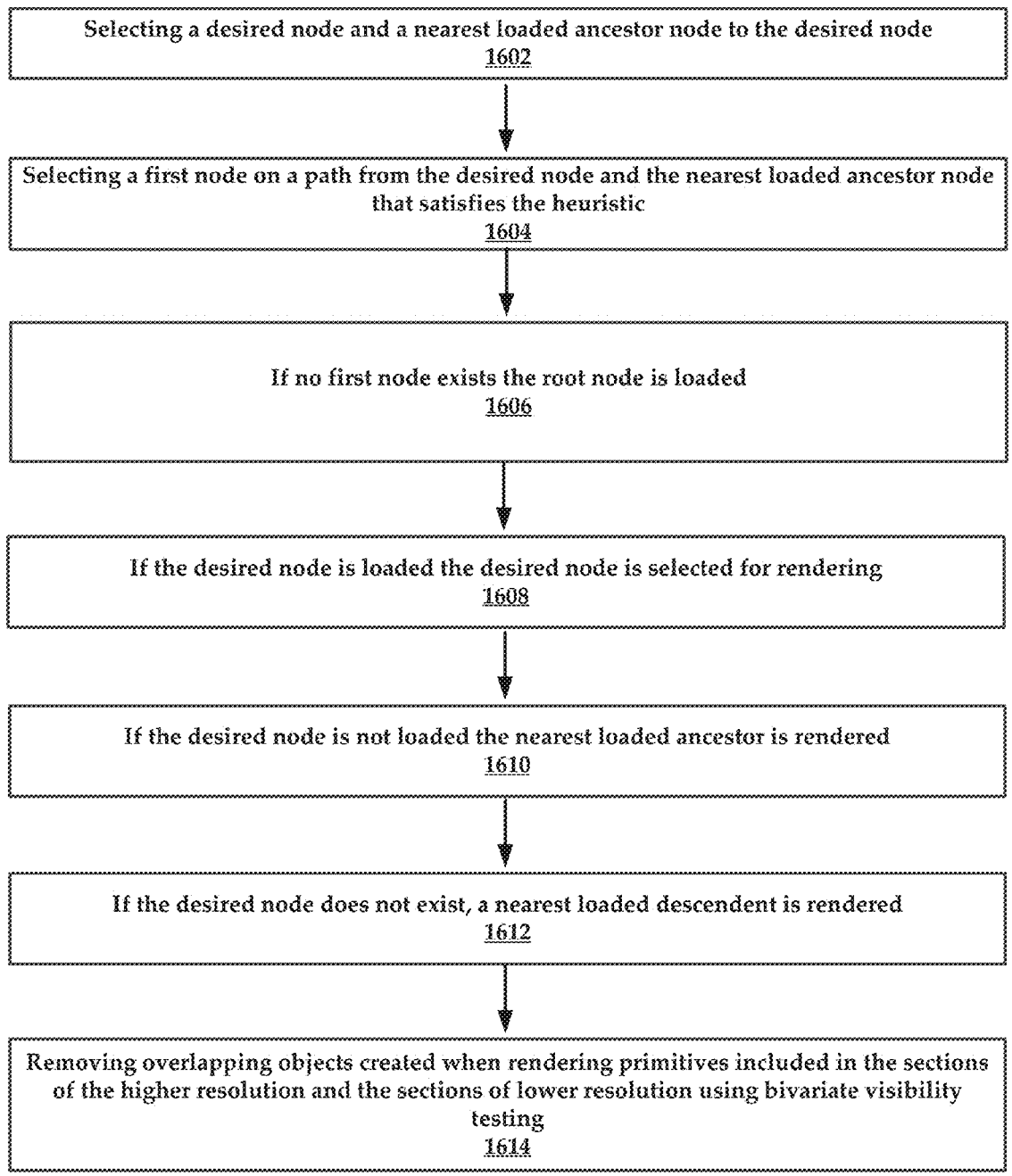
FIG. 16 is a flowchart of an example method of a skipping heuristic.

FIG. 16 illustrates an example method of a skipping heuristic. The method comprises a step 1602 of selecting a desired node and a nearest loaded ancestor node to the desired node. The desired node can include any node in the hierarchical tree that complies with the skipping heuristic. The skipping heuristic can utilize screen space error values as the basis for determining if a node should be skipped or not.

Next, the method includes a step 1604 of selecting a first node on a path from the desired node and the nearest loaded ancestor node that satisfies the heuristic. The nearest loaded ancestor node comprises any of the child nodes and the nodes lower than the child nodes, for example.

If no first node exists the root node is loaded in step 1606, and when the desired node is loaded the desired node is selected for rendering in step 1608. If the desired node is not loaded the nearest loaded ancestor is rendered in step 1610.

If the desired node does not exist, a nearest loaded descendent is rendered in step 1612.

As noted above, a child node of the child nodes or any of the nodes lower than the child nodes are available for loading if within an acceptable screen space error level of a currently loaded node and is a predetermined number of levels away from the currently loaded node. Additionally, if a child node of the child nodes, or any of the nodes lower than the child nodes are selected for rendering but are not loaded, the method comprises rendering the nearest loaded descendent or the nearest loaded ancestor.

In some embodiments, an aggregate three dimensional model comprises sections of higher resolution and the sections of lower resolution obtained from the plurality of three dimensional models, the sections of higher resolution and the sections of lower resolution are loaded and rendered based on the skipping heuristic.

The method can also comprise a step 1614 of removing overlapping objects created when rendering primitives included in the sections of the higher resolution and the sections of lower resolution using bivariate visibility testing. As mentioned throughout, the bivariate visibility testing comprises any of render priority and depth for the primitives. To be sure, high priority primitives always rendered on top of lower priority primitives, and further wherein the method includes occluding any primitive that is occluded by a back-facing primitive.

Figure 17:
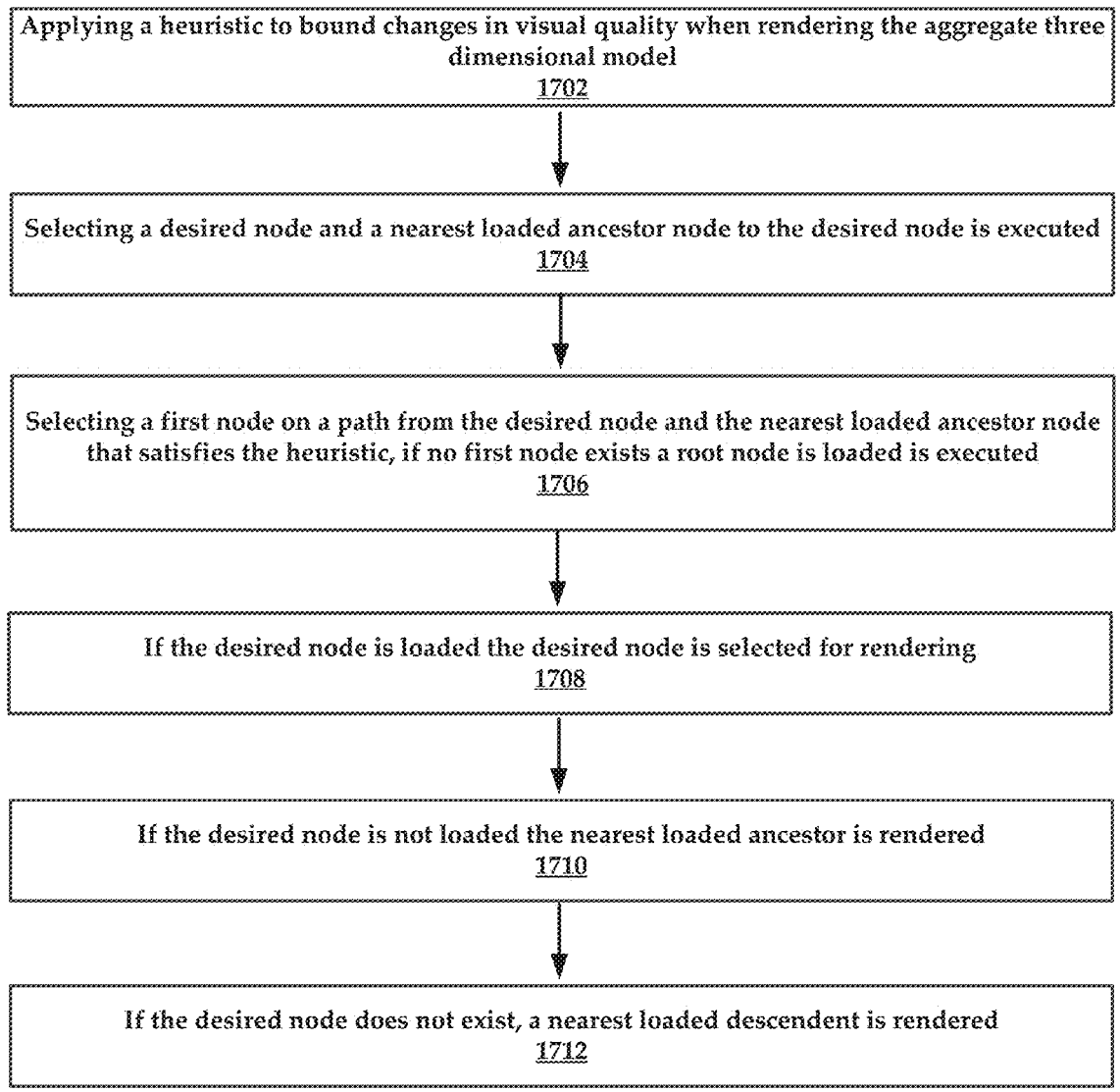
FIG. 17 is a flowchart of an example method for creating an aggregate model in accordance with the present disclosure, specifically using LOD skipping.

FIG. 17 illustrates another embodiment of a method of the present disclosure. In some embodiments, the method involves skipping levels of detail when rendering an aggregate three dimensional model using a plurality of three dimensional models.

In some embodiments, the method comprises a step 1702 of applying a heuristic to bound changes in visual quality when rendering the aggregate three dimensional model. The heuristic defines of a minimum percentage change in screen space error and a minimum change in a level index where one or more nodes in a plurality of nodes in a three dimensional model are not loaded.

In various embodiments the three dimensional model is represented as a hierarchical tree comprising the plurality of nodes.

Next, the method includes steps where for each of the plurality of nodes, using the hierarchical tree a step 1704 of selecting a desired node and a nearest loaded ancestor node to the desired node is executed. Next, a step 1706 of selecting a first node on a path from the desired node and the nearest loaded ancestor node that satisfies the heuristic, if no first node exists a root node is loaded is executed.

If the desired node is loaded the desired node is selected for rendering in step 1708 and if the desired node is not loaded the nearest loaded ancestor is rendered in step 1710.

If the desired node does not exist, a nearest loaded descendent is rendered in step 1712.

Figure 18:
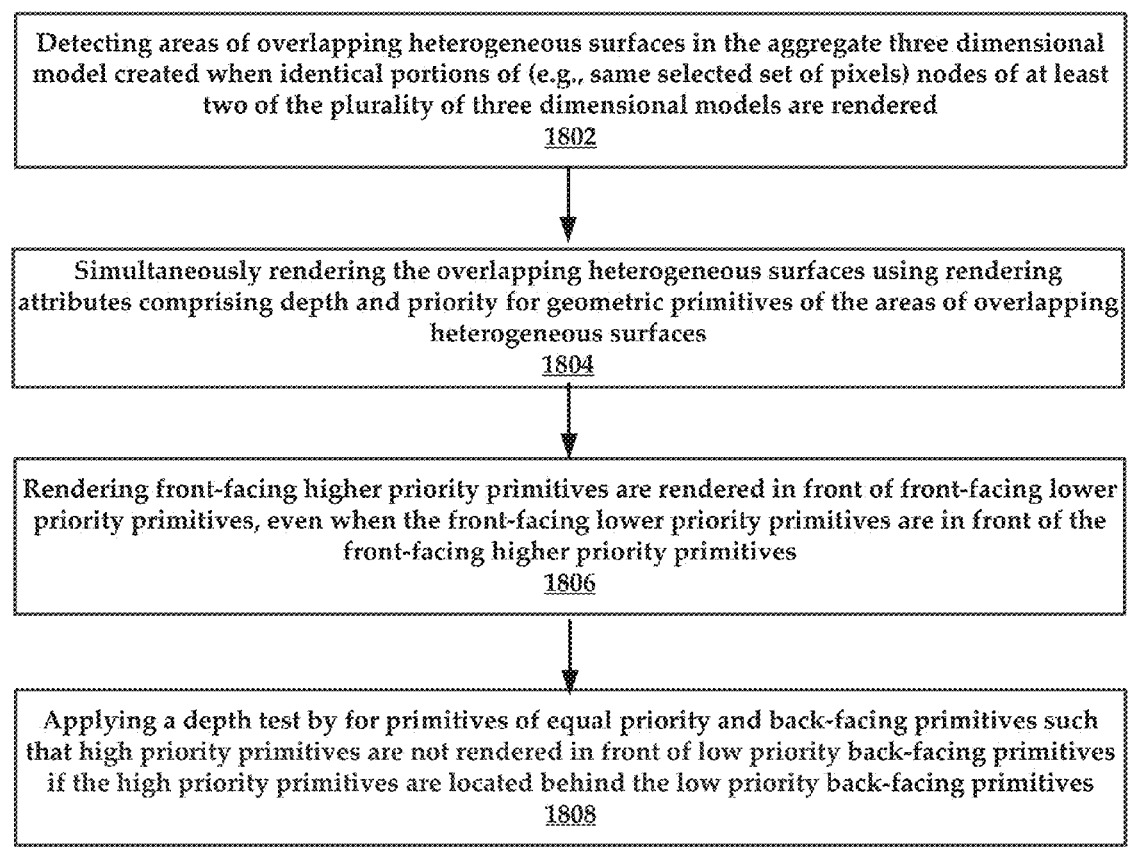
FIG. 18 is a flowchart of another example method of fusing and rendering heterogeneous models (e.g., models of differing resolutions).

FIG. 18 is a follow on method from the method of FIG. 17 that results in removing visual artifacts in the rendered model according to the method of FIG. 17.

In some embodiments, the method comprises a step 1802 of detecting areas of overlapping heterogeneous surfaces in the aggregate three dimensional model created when identical portions of nodes (e.g., nodes are of the same area, such as pixels, of the model) of at least two of the plurality of three dimensional models are rendered. Identical nodes comprise nodes from at least two of the plurality of three dimensional models that are rendered and overlapping, not that the nodes are identical in resolution. For example, a first model can include a selected set of pixels at a first resolution and a second model can include the same selected set of pixels (or larger set that includes the selected set of pixels) at a different resolution.

The method also comprises a step 1804 of simultaneously rendering the overlapping heterogeneous surfaces using rendering attributes comprising depth and priority for geometric primitives of the areas of overlapping heterogeneous surfaces. In some embodiments, front faces of features in the areas of overlapping heterogeneous surfaces are prioritized.

In some embodiments a bivariate visual testing process is used that comprises a step 1806 of rendering front-facing higher priority primitives are rendered in front of front-facing lower priority primitives, even when the front-facing lower priority primitives are in front of the front-facing higher priority primitives. A step 1808 of applying a depth test by for primitives of equal priority and back-facing primitives such that high priority primitives are not rendered in front of low priority back-facing primitives if the high priority primitives are located behind the low priority back-facing primitives.

Figure 19:
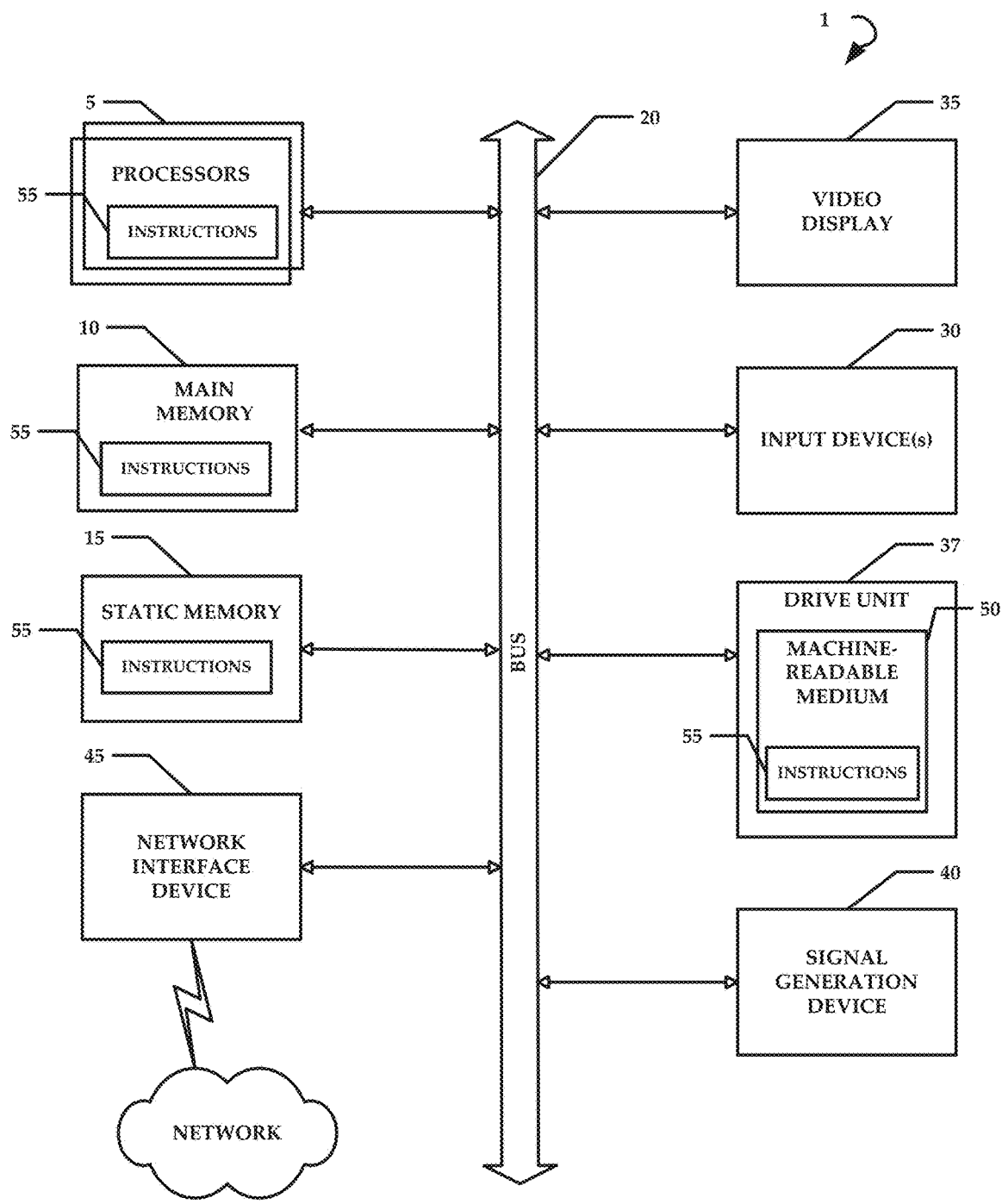
FIG. 19 is a schematic diagram of a computing system that is used to implement embodiments according to the present technology.

FIG. 19 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for skipping levels of detail when rendering an aggregate three dimensional model using a plurality of three dimensional models, the method comprising:
    applying a skipping heuristic to bound changes in visual quality when rendering the aggregate three dimensional model, wherein the heuristic defines a minimum percentage change in screen space error and a minimum change in a level index where one or more nodes in a plurality of nodes in a three dimensional model are not loaded, the three dimensional model being represented as a hierarchical tree comprising the plurality of nodes;
    for each of the plurality of nodes, using the hierarchical tree to choose a desired node and rendering either the desired node or a next best node using a selection heuristic; and
    displaying the aggregate three dimensional model using the selected nodes.

2. The method according to claim 1, wherein each of the plurality of three dimensional models comprises a unique resolution level.

3. The method according to claim 2, further comprising removing visual artifacts in the rendered aggregate three dimensional model.

4. The method according to claim 3, wherein removing visual artifacts in the rendered aggregate three dimensional model comprises:
 using areas of overlapping heterogeneous surfaces in the aggregate three dimensional model created when nodes of identical portions of at least two of the plurality of three dimensional models are rendered; and
 simultaneously rendering the overlapping heterogeneous surfaces using rendering attributes comprising depth and priority for geometric primitives of the areas of overlapping heterogeneous surfaces.

5. The method according to claim 4, wherein the screen space error comprises a ensure of how much a low-resolution one of the plurality of three dimensional models differs from a highest-resolution one of the plurality of three dimensional models when rendered on a display.

6. The method according to claim 5, further comprising determining a selection depth for use in a stencil buffer by:
 removing non-selected nodes in the hierarchical tree; and
 evaluating the new depth of a selected node in the hierarchical tree.

7. The method according to claim 6, further comprising using the selection depth as the priority in render priority stenciling.

8. The method according to claim 4, further comprising fusing the plurality of three dimensional models based on priority, wherein lower priority objects are occluded by higher priority objects.

9. The method according to claim 8, further comprising applying bivariate visibility rules comprising:
 rendering front-facing higher priority primitives in front of front-facing lower priority primitives, even when the front-facing lower priority primitives are in front of the front-facing higher priority primitives; and
 applying a depth test by for all primitives such that any front-facing primitives are not rendered in front of any back-facing primitives, even if the front-facing primitives have a higher priority than the back-facing primitives.

10. The method according to claim 9, further comprising applying a stencil buffer to place higher priority primitives on top of other primitives.

11. The method according to claim 10, further comprising:
 ranking primitives in an ordered list;
 drawing primitives with a stencil test, wherein the primitives pass the stencil test when the primitives render priority is greater or equal than a value of the stencil buffer; and
 upon passing a depth test, the value of the stencil buffer is replaced with a render priority of a last drawn primitive.

12. The method according to claim 11, further comprising occluding any of the primitives that are occluded by a back-facing primitive, by initially writing the back-facing primitives to a depth buffer.

13. The method according to claim 1, wherein choosing the desired node and rendering either the desired node or the next best node using the selection heuristic further comprises:
 selecting the desired node and a nearest loaded ancestor node to the desired node;
 selecting a first node on a path from the desired node and the nearest loaded ancestor node that satisfies the heuristic, and if no first node exists a root node is loaded; and
 wherein if the desired node is loaded the desired node is selected for rendering, and further wherein if the desired node is not loaded the nearest loaded ancestor node is rendered, and additionally wherein if the desired node does not exist, a nearest loaded descendent node is rendered.

14. A method, comprising:
 obtaining a plurality of three dimensional models of a target, each of the models comprising a unique resolution;
 assembling an aggregate three dimensional model by:
  creating a hierarchical tree representation representing the plurality of three dimensional models, the hierarchical tree comprising a root node representing a lowest resolution of the plurality of three dimensional models, child nodes that represent higher resolution versions of the root node, wherein nodes lower than the child nodes comprise a sub-section of the child node to which it belongs and have a higher resolution level than the child node from which it depends;
  skipping any combination of the root node, at least a portion of the child nodes, and the nodes lower than the child nodes according to a skipping heuristic that utilizes screen space error values as a basis for skipping;
  wherein skipping further comprises:
  selecting:
   a desired node, the desired node comprising any of the root node, at least a portion of the child nodes, and a portion of the nodes lower than the child nodes; and
   a nearest loaded ancestor node to the desired node;
  selecting a first node on a path from the desired node and the nearest loaded ancestor node that satisfies the skipping heuristic;
   when no first node exists the root node is loaded; and
   when the desired node is loaded the desired node is selected for rendering, and further wherein if the desired node is not loaded the nearest loaded ancestor node is rendered, and additionally wherein if the desired node does not exist, a nearest loaded descendent node is rendered; and
 loading a portion of the hierarchical tree that was not skipped while executing the skipping step; and
 assembling the aggregate three dimensional model from the portion of the hierarchical tree that was not skipped.

15. The method according to claim 14, wherein a child node of the child nodes or any of the nodes lower than the child nodes are available for loading if it is within an acceptable screen space error level of a currently loaded node and is a predetermined number of levels away from the currently loaded node.

16. The method according to claim 15, wherein if the child node of the child nodes, or any of the nodes lower than the child nodes are selected for rendering but are not loaded, the method comprises rendering the nearest loaded descendent node or the nearest loaded ancestor node.

17. The method according to claim 14, wherein the aggregate three dimensional model comprises sections of higher resolution and sections of lower resolution obtained from the plurality of three dimensional models, the sections of higher resolution and the sections of lower resolution are loaded and rendered based on the skipping heuristic.

18. The method according to claim 17, further comprising removing overlapping objects created when rendering primitives included in the sections of higher resolution and the sections of lower resolution using bivariate visibility testing, the bivariate visibility testing comprising any of render priority and depth for the primitives.

19. The method according to claim 18, wherein higher priority primitives are always rendered on top of lower priority primitives, and further wherein the method includes occluding any primitive that is occluded by a back-facing primitive.

20. The method according to claim 14, further comprising removing visual artifacts in the rendered model.

21. The method according to claim 20, wherein removing visual artifacts in the rendered model comprises:
   using areas of overlapping heterogeneous surfaces in the aggregate three dimensional model created when nodes of identical portions of at least two of the plurality of three dimensional models are rendered; and
   simultaneously rendering the overlapping heterogeneous surfaces using rendering attributes comprising depth and priority for geometric primitives of the areas of overlapping heterogeneous surfaces.

22. The method according to claim 20, wherein the screen space error comprises a measure of how much a low-resolution one of the plurality of three dimensional models differs from a highest-resolution one of the plurality of three dimensional models when rendered on a display.

23. The method according to claim 22, further comprising determining a selection depth for use in a stencil buffer by:
   removing non-selected nodes in the hierarchical tree representation; and
   evaluating the new depth of a selected node in the hierarchical tree representation.

24. The method according to claim 23, further comprising using the selection depth as the priority in render priority stenciling.

25. The method according to claim 14, further comprising fusing the plurality of three dimensional models based on priority, wherein lower priority objects are occluded by higher priority objects.

26. The method according to claim 25, further comprising applying bivariate visibility rules comprising:

rendering front-facing higher priority primitives in front of front-facing lower priority primitives, even when the front-facing lower priority primitives are in front of the front-facing higher priority primitives; and
applying a depth test by for all primitives such that any front-facing primitives are not rendered in front of any back-facing primitives, even if the front-facing primitives have a higher priority than the back-facing primitives.

27. The method according to claim 26, further comprising applying a stencil buffer to place higher priority primitives on top of other primitives.

28. The method according to claim 27, further comprising:
   ranking primitives in an ordered list;
   drawing primitives with a stencil test, wherein the primitives pass the stencil test when the primitives render priority s greater or equal than a value of the stencil buffer; and
   upon passing a depth test, the value of the stencil buffer is replaced with a render priority of a last drawn primitive.

29. The method according to claim 28, further comprising occluding any of the primitives that are occluded by a back-facing primitive, by initially writing the back-facing primitives to a depth buffer.

30. The method according to claim 14, wherein selecting a desired node and rendering either the desired node or the next best node using a selection heuristic further comprises:
   selecting the desired node and a nearest loaded ancestor node to the desired node;
   selecting a first node on a path from the desired node and the nearest loaded ancestor node that satisfies the heuristic, if no first node exists a root node is loaded; and
   wherein if the desired node is loaded the desired node is selected for rendering, and further wherein if the desired node is not loaded the nearest loaded ancestor node is rendered, and additionally wherein if the desired node does not exist, a nearest loaded descendent node is rendered.

* * * * *